A. G. F. SCHUSTER & I. R. JOHNSON.
CONDUIT TERMINAL.
APPLICATION FILED DEC. 11, 1915.
1,283,574. Patented Nov. 5, 1918.
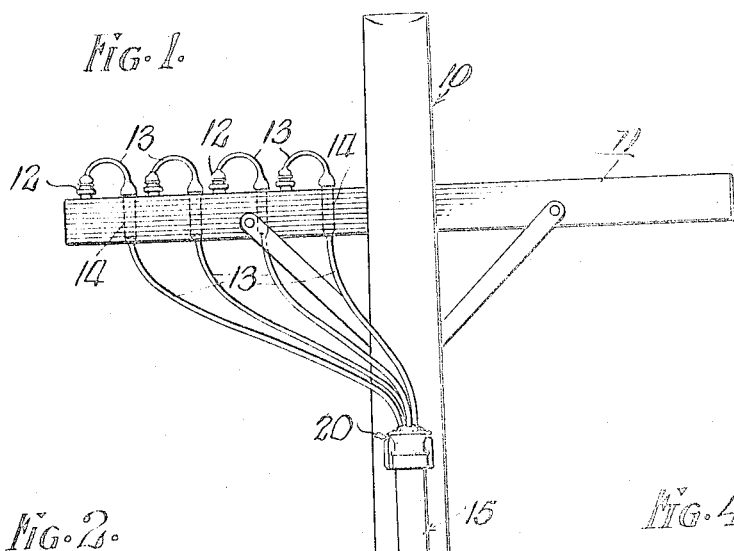
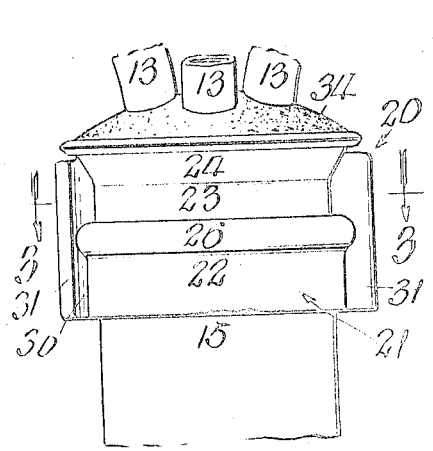
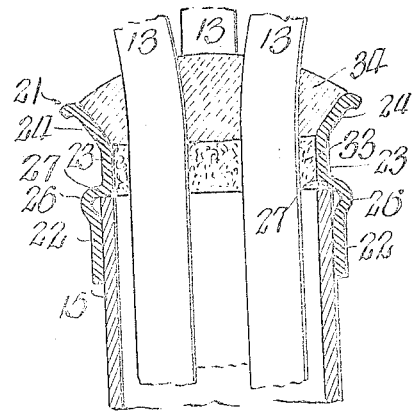
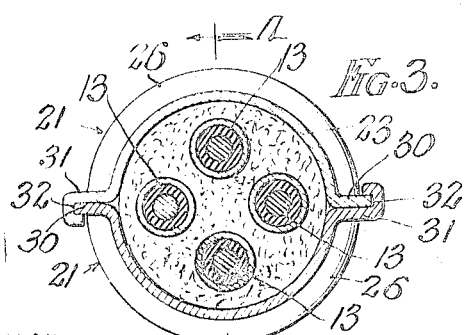
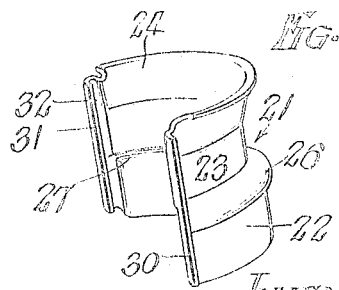

UNITED STATES PATENT OFFICE.

AUGUST G. F. SCHUSTER AND IVER R. JOHNSON, OF CHICAGO, ILLINOIS.

CONDUIT-TERMINAL.

1,283,574.

Specification of Letters Patent.

Patented Nov. 5, 1918.

Application filed December 11, 1915. Serial No. 66,337.

*To all whom it may concern:*

Be it known that we, AUGUST G. F. SCHUSTER and IVER R. JOHNSON, citizens of the United States, residing at Chicago, in the county of Cook and State of Illinois, have invented new and useful Improvements in Conduit-Terminals, of which the following is a specification.

Our invention relates to improvements in conduit terminals and consists of the matters hereinafter described and more particularly pointed out in the appended claims.

Our improved conduit terminal is more particularly adapted for use upon the upper end of upright wire or cable conduits or pipes such as are usually attached to the upright supporting poles used in telephone, telegraph and other electric current conducting systems.

In the general practice now in use, the overhead current conducting cables are generally supported upon the upright wooden poles which are suitably embedded in the ground. To the top of the poles are attached the usual cross arm or cross arms, which carry the insulator knobs to which the wires or cables are secured by tie wires.

When it is desired to transpose the current conducting cables from an underground system to an overhead system or vice versa said current conductors are passed through a protecting conduit which is fixed to one of said poles by means of large staples. This conduit is usually an iron pipe the bottom end of which extends into the vicinity of the underground conduit and the top end of said conduit terminates in the vicinity of the bottommost cross arm on the pole.

Each current conductor is led up from the underground conduit through this pole conduit where it is distributed to an associated "pothead" or other device on the cross arm of the pole, which will provide for the convenient tapping of the cables.

Owing to their construction the conductors, which generally comprise an inner core containing a single or a plurality of wires with an outer tubular sheathing or covering of lead are quite heavy in weight and as is apparent where no means are provided to maintain the cables in a permanent relation to the conduit on the pole, the entire weight of the conductors in said pole conduit is imposed upon the "pothead" or other devices and under the action of gravity, the conductors tend to settle or creep lower in the pole conduit tending to pull the "pothead" or other devices off the cross arms and destroy the connections therein. Also, when the cables engage the top edge of the pole conduit, this settling or creeping of the cables therein abrades the lead covering thereof, exposing the insulation, ultimately causing short circuit, and destruction of the cable or conduit or both. This is further augumented by the fact that the pole conductors are sometimes open at their top permitting the entrance of rain, snow and foreign matter.

It is the object of this invention to produce a device which will prevent the settling and creeping of the conductors relative to the pole conduit, which will prevent the engagement of the conductors with the end of the conduit and which will prevent the entrance of rain, snow or foreign matter into said conduit, thus eliminating the various objectionable conditions hereinbefore set forth.

In the drawings:

Figure 1 is a view in elevation of the top end of a current conductor supporting pole with our improved conduit terminal affixed to the top end of the pole conduit.

Fig. 2 is a view in side elevation on an enlarged scale of our improved conduit terminal as when in place upon an associated conduit.

Fig. 3 is a horizontal sectional view therethrough the plane of section being indicated by the line 3—3 of Fig. 2.

Fig. 4 is a vertical sectional view, the plane of the section being indicated by the line 4—4 of Fig. 3.

Fig. 5 is a perspective view of one of the parts of our improved conduit terminal.

Referring more in detail to that embodiment of our invention illustrated in the accompanying drawings, 10 indicates the upper end of one of the usual current conductor supporting poles, having the usual transverse cross arm 11 fixed thereto. 12 indicates a plurality of insulator knobs mounted on said cross arm and to which are tied by means of the usual tie wires, current conducting wires or cables 13. As illustrated said conductors are entered into the usual "potheads" or other devices 14 which are generally attached to said cross arm adjacent an associated insulator. From the "potheads" 14 the conductors 13 extend downwardly into and through an upright conduit or pipe 15 which is attached to the pole 10 by means of large staples 16, only one of which is shown in this instance.

The cables extend the full length of said conduit 15 and into underground conduit (not shown) adjacent the lower end thereof.

To the upper end of said conduit or pipe 15, is attached our improved terminal indicated as a whole by the numeral 20. As illustrated said terminal is preferably made in a plurality of parts, in this instance, two parts 21—21 one of which is illustrated in perspective in Fig. 5.

Said parts are preferably made of stamped metal of sufficient strength and rigidity to withstand the strain to which they are subjected. As each part 21 is identical in construction, a description of one part will suffice for both. Each part or member comprises a semi-tubular body portion 22, a neck portion 23 and an outwardly flared mouth portion 24, the upper marginal part of said flared mouth portion 24, terminating in a rolled bead, to provide a smooth edge therefor. Intermediate the body and neck of each part 21 is formed a rib 26 which provides on the inside at the bottom of the neck portion 23, a semi-annular shoulder 27 adapted for engagement with the top edge of the conduit 15 (see Fig. 4.)

When the terminal as a whole is in position upon the conduit or pipe 15, said shoulders 27 rest upon the edge of said conduit with the body parts 22 thereof embracing a portion of the conduit adjacent its top end.

Each part 21 is provided at its lateral vertical edges with means which co-act with like means upon adjoining edges of an associated part 21, so that two of such parts may be interlocked together in position upon the upper end of the conduit 15 in a manner presently to be described and such means are as follows:

One lateral vertical edge of each part 21 is formed with a radial flange 30 which extends almost the full height of said edge. The opposite edge of said part is provided with a vertical extending hook member 31 defining a groove 32 diametrically opposite the flange 30 before referred to.

The terminal may be easily attached to conduits already installed, in the following manner: One of the parts 21 is placed in position upon the top end of the conduit or pipe 15 with its shoulder 27 resting upon the upper edge thereof. A second part 21 is then placed in position in a plane above the part 21 already in place but on the opposite side of the said conduit 15, with its flange 30 and groove 32 in vertical alinement with the groove 32 and flange 30 of the associated part 21. A downward movement is then imparted to said member until its shoulder 27 engages upon the top edge of the conduit when said parts are then interlocked to each other.

The outwardly flared flanges 24 thus define a mouth adapted to receive a means for closing the top of said pole conduit and for gripping the conductors therein. This is provided for in the following manner: A packing material 33 such as cotton waste or the like is inserted into the mouth so formed and then tamped down around the conductors 13 until it fills the neck portion above the top edge of the conduit 15 up to the beginning of the flared mouth 24. If it extends into the said conduit no harm is done. A cementitious compound, preferably of a waterproof nature, in a plastic state is then put into the mouth as is indicated at 34, the packing 33 forming a support for and at the same time preventing the entrance of the same into the conduit. This cement compound is finished off as shown so that it will shed water about the rolled edge of the mouth.

The conductors 13 are temporarily supported in any suitable manner from the cross arm or pole until the cement compound sets or hardens. When set it adheres to the conductors 13 therein and on account of the flare given to said mouth the said conductors 13 cannot draw the same downwardly into the conduit 15. It is thus apparent that after the cement compound has set and hardened it will act as a plug for the terminal 20 to close the conduit 15 and also to hold the conductors 13 in a suspended relation therein, in a manner effectually preventing any settling or creeping of said conductors. This removes the supporting strain from the potheads or other devices and prevents the entrance of rain, snow or other foreign matter into the conduit 15 at this point.

When the conductors 13 in the conduit 15 generate heat, as they sometimes do, this heat can escape, or vent itself on and about the inner surfaces of the flanges and hooks 30 and 31 respectively before mentioned.

Our improved conduit terminal possesses many advantages as is apparent from the foregoing description and while in describing the same we have referred to certain details of construction and arrangement of the parts, we do not wish to limit ourselves thereto except as may be pointed out in the appended claims.

We claim as our invention:

1. In combination with a conduit and conductors therein, a terminal for said conduit comprising a plurality of identical parts adapted to interlock with each other and to engage the end of said conduit, said parts having outwardly flared portions providing a mouth for said terminal, and means carried by said outwardly flared portions for closing said mouth and preventing movement of said conductors relative to said terminal.

2. In combination with a conduit and conductors therein, a terminal for said conduit comprising a plurality of identical parts adapted to interlock with each other and to engage the end of said conduit, said parts having portions providing an outwardly flaring mouth for said terminal and a plug adapted to seat in said mouth so as to close the same and to prevent movement of said conductors relative to said terminal.

3. In combination with a conduit and conductors therein, a terminal for said conduit comprising a plurality of identical parts adapted to interlock with each other and to engage the end of said conduit, said parts having portions for providing an outwardly flaring mouth for said terminal, and a filling of cementitious material for said mouth adapted to close the same and to embrace said conductors, said filling preventing movement of said conductors relative to said terminal parts to each other and to the conduit.

4. In combination with a conduit and conductors therein, a terminal for said conduit comprising a plurality of identical parts having interlocking adjoining edges adapted to be supported on said conduit, said parts each having a rib intermediate its ends that forms a part of an annular shoulder adapted to engage and rest upon the end of said conduit, said parts being flared outwardly at one end to provide a mouth for said terminal as a whole, and a plug of cement compound supported in said mouth adapted to close the same and to prevent movement of said conductors relative to said conduit.

5. A device of the character described comprising a plurality of arcuate parts, each of which is provided at one edge with a radial flange and at its other edge with a hooked flange adapted to receive the radial flange of an adjacent part, each part being formed at one end with an arcuate flange and at the other with an outwardly flared flange and with a shoulder intermediate said last mentioned flanges.

AUGUST G. F. SCHUSTER.
IVER R. JOHNSON.

Witnesses:
C. B. VAN ANTWERP,
W. A. B. AUSTIN.